Figure 1:
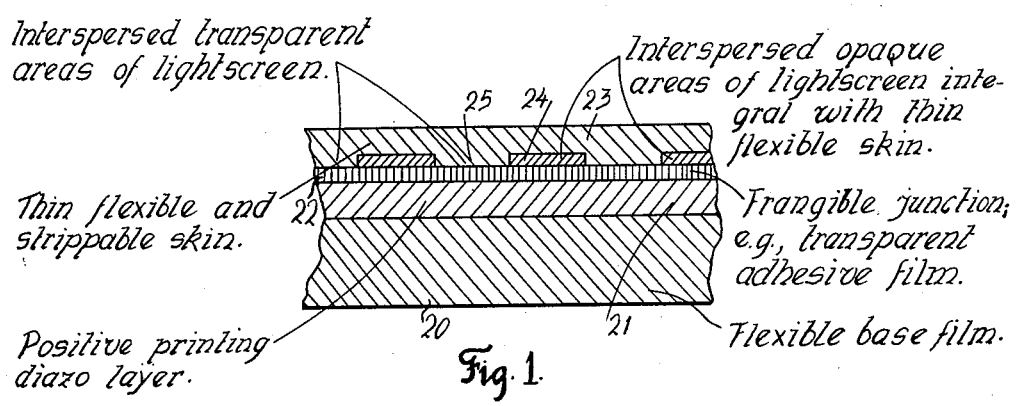

Patented July 8, 1952

2,602,741

UNITED STATES PATENT OFFICE 2,602,741

SENSITIZED SHEETS FOR SCREEN REFLECTOGRAPHY

Lodewijk Pieter Frans van der Grinten and Matheus Marinus Paulus Vallen, Venlo, Netherlands, assignors to Chemische Fabriek L. van der Grinten, Venlo, Netherlands, a company of the Netherlands Application October 24, 1946, Serial No. 705,309
In the Netherlands November 1, 1945

11 Claims. (Cl. 95—8)

This invention relates to improvements in sensitized sheet for making screen reflex copies from originals which are opaque or substantially opaque to light rays or from originals printed on both sides.

To prepare these so called screen reflex copies on sensitized transparent film, the light rays must, when acting on the sensitized layer, be split up by passage through a screen (cf. applicants' prior invention described in U. S. Patent No. 2,026,292). This division of the light must satisfy special requirements. Contrary to those of halftone screen production, in which a division is required with graded differences of intensity, the division in screen-reflectography methods must be such that only sharp transitions from full to minimum intensity occur.

This particular division is, in practice, obtained by making the light pass through a screen close to the sensitized layer, i. e. through a covering screen having exclusively sharp transitions, the screen being in as close contact with the sensitized layer as possible. The immediate proximity of the screen and the sensitized layer is necessary, because in practice diffused light is mostly used for the radiation.

The screen and the sensitized layer must not, during exposure, move in relation to each other, more particularly not when the exposure takes place in an exposing-apparatus in which the original to be copied is carried over a pane together with the sensitive material by means of a conveying cloth.

U. S. Patent No. 2,026,292 describes sensitized sheets for screen reflectography, which themselves contain a covering screen, the screen being organically connected with the sensitized film. With some of these screened sensitized sheets the screen may remain on the film after the exposure, with others it has to be removed after exposure, as otherwise the screen pattern would make the reflex copy useless.

Example 2 of the said U. S. patent describes the production of a screen reflex copy by means of such a screened sensitized sheet, in which the screen is removed after exposure. A cellulose film is there sensitized with a diazo compound on which a screen pattern is printed with a certain ink preparation, and this preparation is soaked, after copying, in an alkaline developing bath and if necessary removed by rubbing.

This invention is concerned with a sensitized sheet for screen-reflectography provided with a removable screen. The two main obstacles in preparing products of this kind are (1) the screen pattern must be closely adjacent to and firmly held in contact with the sensitized film and must remain attached until after the exposure, during which exposure the film has a tendency to stick to the glass panel over which the film is moving in conventional exposure apparatus and (2) after the exposure has been effected the screen pattern must be quickly, easily and completely separable from the sensitized film, preferably without the necessity of soaking in a bath. The difficulty in the production of a successful film of this character is evident from the opposing requirements which must be reconciled.

The known screened sensitized sheets, of which the screen pattern organically belongs to the sensitized film, hardly satisfies these two requirements.

The screened sensitized sheet, according to the present invention, in order to satisfy these two requirements, comprises a screen (screen pattern) which is organically (or in other words: constitutionally or structurally) united with a film hereafter termed the skin, itself connected to the sensitized film by adhesion. This ensures that the screen pattern is in as close contact as possible with, i. e. in the immediate vicinity of the sensitized layer of the film, although the screen pattern is organically united with the skin and will remain so.

This screened sheet has the advantage of, firstly, that it satisfies the main requirement in the practice of reflectography, viz., close contact and firm connection between screen-pattern and sensitized layer and, secondly, that it is easy to operate, is not easily injured and can hence stand up to packing and shipment and exposure particularly exposure by transport through an exposing apparatus with frictional resistance. Furthermore the removal of the screen can readily be effected by breaking the adhesion and by removing the skin carrying the screen, which makes long soaking and the use of cleaning materials and suchlike unnecessary.

The present invention further contemplates a form of screened sensitized sheet in which the screen skin can be stripped off dry from the sensitized film. The skin can then be so tough that it is possible to tear or lift it entirely from the film after exposure, either by hand or by other means, breaking the adhesion, by which it is connected to the sensitized film.

This form of sheet with a screen skin capable of being stripped off dry is specially advantageous where the sensitized layer requires, for its finishing into an image, no other treatment than an after-treatment with vapour, such as is the case e. g. with the so-called two component layers of the diazotype, which are developed with ammonia vapour.

There are particular advantages in the combination of a screen skin with a sensitized film sensitized with a diazo-compound. Herewith it often occurs that towards the end of the exposure the adhesion connecting skin and film weakens, so that the screen skin is now looser than prior to the exposure; and this helps in removing it. This loosening is thought to be the result of the development of nitrogen due to the decomposition of the diazo-compound by the photochemical reaction.

If in this case the skin has a local screenless area, in other words is locally entirely pervious to light, so that the film sensitized with diazo-compound is thus entirely exposed in this area to a sudden intensive radiation, the skin will in this area be loosened still more, so that the removal of the skin may be started at this point. It goes without saying that the screenless area will by preference be chosen at an edge of the sheet. The diminution of the adhesion by exposure is probably due to the development of nitrogen.

It is also possible according to a further feature of the invention to provide screened sensitized sheets having the screen skin loose from the sensitized film in some place or other, for preference at an edge or corner of the sheet, so that the removal may be started with this loose piece.

According to a special embodiment of the invention, the removal of the skin can be effected particularly satisfactorily by closely contacting the sensitized sheet on its screened side with an adhesive surface and thereafter separating the two surfaces again. In this case the adhesive surface must be of such a nature that the adhesion of the skin with respect to the sensitized sheet is smaller than that with respect to the adhesive surface.

It is often easier to effect the removal of the skin in this way than by stripping off the screen skin manually. This is particularly the case when the screen skins are very thin and weak, and it applies particularly to skins weighing less than approximately 20 g./m.².

This embodiment for the removal of the screen will, in many cases, make it possible to remove the screen mechanically. This will be elucidated with reference to the drawing, in which Fig. 1 is an enlarged diagrammatic cross-section through a screen skin sheet made according to one embodiment of this invention, while Figs. 2 and 3 diagrammatically represent devices adapted to effect the removal of the screen mechanically.

Figure 2:
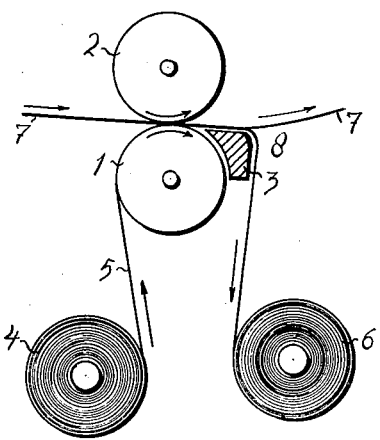

In Fig. 2, 1 is a cylinder on which a cylinder 2 exercises a slight pressure. 3 is a frame parallel to the cylinder 1 and extending over its entire length. 4 is a roll of adhesive paper. When the apparatus is in operation, the adhesive paper 5 will move in the direction of the arrows from roll 4 by way of cylinder 1 and frame 3 to roll 6, where it is re-rolled. The cylinder 1 is actuated, for instance by hand, by means of a crank, the roll 6 being driven in advance run by means of friction, whilst the roll 4 is checked. The adhesive paper 5 consequently runs through the apparatus under tension. On the cylinder 1 it has its adhesive layer outermost. When a sensitized sheet 7, suitable for the purpose and provided with a screen skin is passed with the skin side directed downwards between the cylinders 1 and 2, it will unite with the adhesive paper at the point of passage between the said cylinders and together therewith proceed on its way to the edge 8 of frame 3. Here the adhesive paper makes a sharp angle downwards, while the sensitized sheet runs straight on (as a rule it is stiff enough to do that). If its degree of adhesion with respect to the sensitized sheet is smaller than that with respect to the adhesive layer, the screen skin will now be carried along on the latter; in this manner the screen is removed from the sensitized sheet. After that, it can be subjected to the usual after-treatment, for example in the case of a diazotype sheet, a half-wet or dry developing process. The descreening apparatus can be coupled with a developing-apparatus.

Figure 3:
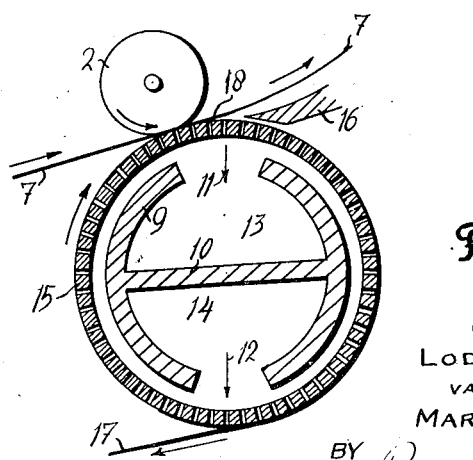

In Fig. 3, 9 is a stationary hollow cylinder with the partition 10, and the slots 11 and 12, extending over the entire length of the cylinder. On one side of the partition 10 there is the chamber 13 and on the other side the chamber 14. These chambers are closed at one end, the other end being connected to an air-pump, pumping the air from 13 to 14. The air consequently streams in at 11 and out again at 12. Round this cylinder 9 a perforated cylinder 15 rotates in the direction of the arrow. The cylinder 2 exerts pressure on 15. The outer surface of 15 may be adhesive. After an image has been formed, a screened sensitized sheet 7 with the screen skin directed downwards is introduced between cylinder 2 and cylinder 15, moves in the direction of the arrow, is caught by the suction at 11 and stuck on the surface of 15, after which it is lightly loosened at 18 by means of a pointed or narrow knife-shaped object 16 and conducted farther (e. g. by hand) in the direction of the arrow. If at 18 the adhesion of the screen skin with respect to the wall 15—which adhesion is due to the sucking and/or adhesive power of the said wall—is greater than that with respect to the sensitized sheet, the screen skin will continue its way together with the wall 15 and is blown off by the air-stream coming from the slot 12.

It will be understood that in this description of the drawing words like "adhesive surface" and the like, are to be taken in a wide sense. Thus, the conception "adhesive surface" e. g. also implies a so-called vacuum surface or a combination of a vacuum and an adhesive surface.

In practice the sensitized surface of the sensitized film is sometimes made dull (mat). While this improves the copy which is made, as it becomes easier to read and can be written on, such dulling however, has this disadvantage, that it diffuses and obstructs the light falling through the screen openings during exposure.

It was found that this objection of the dulled sensitized films is eliminated when they are provided with a screen skin, according to this invention. The adhesive between skin and sensitized film neutralises dulling, and yet it reappears when, after the exposure, the skin together with the adhesive is removed.

When the sensitized film partly or entirely loses its absorbing power by exposure, the screened sheet according to the invention may, by a preliminary exposure of the screened side of it, be made more sensitive.

The screened sheets according to the invention are handy and clean in use, while the copies produced by means of them are not disfigured by particles of screen remaining behind, which often occurs in practice with the known type screened sheets where the screen pattern is organically united with the sensitized film.

*Example 1*

A. A unilaterally dulled film of acetyl-cellulose of the size of a normal letter with a weight of 70 g. per m.$^2$ is on its dulled side saponified and sensitized in the usual way with para-diazoethyl-benzyl-aniline.

B. A skin of acetyl-cellulose of 35 g. per m.$^2$ is unilaterally saponified and sensitized with a solution of:

6 g. p-diazo-o-chlorodimethyl-analine-chloride
2 g. oxalic acid
1 g. phenol
20 g. ethylalcohol
80 g. water A relief covering screen is made in the following way.

Small elevations in the form of squares are produced on a glass plate by etching it, the sides of these squares being approximately 0.035 mm. and the height approximately 0.015 mm., while the distance from centre to centre of these squares is approximately 0.08 mm. The relief side of the plate is then covered by a thin silver layer and thereafter polished; due to the latter operation the mirrorlike silver layer only remains in the depths of the relief and disappears on the elevations, so that the squares in relief become transparent (compare U. S. Patent 2,295,632).

A relief covering screen thus obtained is copied in contact, by means of arc light, on the above described sensitized skin B, in such a way that the sensitized areas lying beneath the parts pervious to light of the covering screen are bleached. The skin is then developed in ammonia vapour. The screened skin B thus obtained is on its screen side provided with a thin layer of rubber latex and then dried. The screen skin is then attached under considerable pressure on its latex side, to the sensitized side of the film A sensitized with p-diazoethylbenzyl-aniline.

The component parts of a screen skin sheet structure so obtained are illustrated diagrammatically in the magnified cross-section of Fig. 1, wherein the associated legends indicate the nature of components. In this figure, 20 is a flexible base film transparent to light to which the covering positive printing diazo layer 21 is sensitive. 23 is a relatively thin flexible and strippable skin overlying the sensitized side of the base film and joined firmly thereto, in this embodiment, by a very thin transparent adhesive film 22. The skin 23 comprises an integral light screen which at least nearly contacts the light-sensitive diazo layer and consists of a myriad of minute integral areas 24 opaque to said light and interpersed with minute integral areas 25 which are transparent to said light. The adhesive film 22 forms a flexible junction between the screen skin and the sensitized base film permitting the screen skin to be stripped off so as to yield the base film as a screenless exposure.

By means of the sensitized screened sheet thus obtained it is possible by exposure through the screen to make a reflex copy, e. g. in an exposing apparatus provided with frictional sheet feeding means. The exposure is no longer than if the sensitized film had not been dulled. After exposure the screen skin together with the layer of adhesive is loosened at one corner and the whole is stripped from the film, whereafter the sensitized sheet is developed by applying to it a thin layer of a diazotype-developer alkalized with soda, containing an azo-component e. g. phloroglucinol. The screen reflex-copy obtained is superficially dull and can be written on. If the screened sensitized sheet is subjected, before making the reflex-copy, to a preliminary exposure through the screen-pattern, e. g. with a dark background, then the time of exposure in making the reflex-copy can be shortened.

*Example 2*

The same procedure is followed as in Example 1, but the film A is sensitized in the usual way with an aqueous solution of:

5% p-diazo-dimethyl-meta-toluidine-sulphate
2% oxalic acid
1% thiourea
1% phloroglucinol
0.1% gelatine
10% ethyl alcohol After exposure the screen skin B is stripped off and the sheet is developed in ammonia vapour.

*Example 3*

A. An acetyl-cellulose film with a weight of 80 g. per m.$^2$ is unilaterally saponified and on that side sensitized with an aqueous solution of:

5% p-diazo-dimethyl-meta-toluidine-sulphate
2% oxalic acid
1% thiourea
1% phloroglucinol
0.1% gelatine
10% ethyl alcohol B. A skin of acetyl cellulose of 15 g. per m.$^2$, affixed to smooth paper, is saponified on its free side and on that side sensitized with an aqueous solution of:

6% p-diazo-o-chlorodimethyl-aniline-chloride
2% oxalic acid
1% phenol
20% ethyl alcohol A relief covering screen such as described in Example 1, is copied in contact by means of arc light on the above-mentioned sensitized skin, after which the latter is developed in ammonia-vapour. The screen skin, by means of a dilute solution of rubber in benzene, is made to adhere with the screen side to the sensitized side of the film A. Thereupon the paper on which the skin B was attached, is stripped off.

The sheet consisting of the parts A and B is subjected to exposure in the manner customary in screen-reflectography, after which, in an apparatus according to Fig. 2, it is brought into contact on its screen side with an adhesive paper obtained by treating paper with a solution of:

4% Pará rubber
2% colophony in benzene and a drying process.

The screen skin B is separated from the sheet A and the latter developed in ammonia-vapour.

What we claim is:

1. A method for removing the screen skin of a sensitized sheet used for screen reflectography, said sheet comprising a flexible base carrying over on one side a light sensitive positive printing diazo layer, said base being transparent to light to which said layer is sensitive, and an adhering but separable skin having as an organically united part thereof a screen pattern in substantially face to face relation to the sensitized layer of the base and consisting of a myriad of interspersed minute areas respectively transparent and opaque to such light, without intermediate gradated transitions, which method comprises moving a separate surface into contact with the screen skin, adhering the exposed surface of the skin to said separate surface with strength greater than the strength of adhesion of the skin to the base, and then forcing the base and said separate surface through divergent paths so that the screen skin separates from the base with said separate surface.

2. A sensitized diazotype sheet for screen reflectography comprising, as a unitary flexible sheet structure, a flexible base film sensitized over one side with a positive-printing diazo layer and transparent to the light to which said layer is sensitive, and a relatively thin flexible skin overlying the sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being frangible so that the skin is strippable to yield the base film as a screenless exposure.

3. A sensitized diazotype sheet for screen reflectography comprising, as a unitary flexible sheet structure, a flexible cellulosic base film carrying a positive-printing diazo layer over one side and transparent to the light to which said layer is sensitive, and a relatively thin flexible cellulosic skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being frangible so that the skin is strippable to yield the base film as a screenless exposure.

4. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being effected by a thin film of an adhesive transparent to said light and being frangible so that the skin is strippable to yield the base film as a screenless exposure.

5. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the weight of said skin being less than about 20 grams per square meter of surface area, the junction between the skin and the base film being frangible so that the skin is strippable to yield the base film as a screenless exposure.

6. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being frangible and the skin having a greater cohesive strength than its strength of adhesion to the base film so that the skin is strippable bodily from the base film in a dry state.

7. A sensitized diazotype sheet for screen reflectography comprising, as a unitary flexible sheet structure, a flexible base film carrying a positive-printing diazo layer over one side and transparent to the light to which said layer is sensitive, said layer containing a light-sensitive diazo compound and an azo coupling component, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being frangible so that the skin is strippable to yield the base film as a screenless exposure.

8. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, said skin having at least one screenless local portion at a margin of the sheet, and the junction between the skin and the base film being frangible so that the skin is strippable to yield the base film as a screenless exposure.

9. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being frangible so that the skin is strippable to yield the base film as a screenless exposure, the sensitized side of the base film being roughened to give the exposure a mat finish.

10. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, the junction between the skin and the base film being effected by a thin film of a flexible pressure-sensitive adhesive transparent to said light and being frangible so that the skin is strippable to yield the base film as a screenless exposure.

11. A sensitized diazotype sheet for screen reflectography comprising, as a unitary flexible sheet structure, a flexible base film carrying a positive-printing diazo layer over one side and transparent to the light to which said layer is sensitive, and a relatively thin flexible skin overlying said sensitized side and joined firmly thereto over substantially the whole surface thereof so that the base film and skin do not separate in handling or exposing the sheet, said skin comprising an integral light screen which at least nearly contacts the light-sensitive layer and consists of a myriad of minute areas opaque to said light interspersed with minute areas transparent thereto without intermediate gradated transitions, said screen being a photographic formation in a diazotype layer on one side of said skin, the junction between the skin and the base film being frangible so that the skin is strippable to yield the base film as a screenless exposure.

LODEWIJK PIETER FRANS VAN DER GRINTEN.
MATHEUS MARINUS PAULUS VALLEN.

REFERENCES CITED

The following references are of record in the file of this patent:

UNITED STATES PATENTS

| Number | Name | Date |
| --- | --- | --- |
| 1,116,803 | Dainoff | Nov. 10, 1914 |
| 1,565,256 | Christensen | Dec. 15, 1925 |
| 2,026,292 | Van der Grinten | Dec. 31, 1935 |
| 2,051,585 | Van der Grinten | Aug. 18, 1936 |
| 2,134,080 | Flader | Oct. 25, 1938 |
| 2,143,791 | Nadeau | Jan. 10, 1939 |
| 2,295,632 | Buskes | Sept. 15, 1942 |
| 2,370,321 | Mueller | Feb. 27, 1945 |
| 2,415,442 | Rackett | Feb. 11, 1947 |
| 2,415,624 | Brown et al. | Feb. 11, 1947 |
| 2,417,060 | Capstaff | Mar. 11, 1947 |